(12) United States Patent
Kissel, Jr.

(10) Patent No.: US 7,559,506 B2
(45) Date of Patent: Jul. 14, 2009

(54) INTEGRAL POWERED WING AIRCRAFT

(76) Inventor: Waldemar F. Kissel, Jr., 3600 NW. 43rd St., Suite C-1, Gainesville, FL (US) 32606

( * ) Notice: Subject to any disclaimer, the term of this patent is extended or adjusted under 35 U.S.C. 154(b) by 113 days.

(21) Appl. No.: 11/521,597

(22) Filed: Sep. 14, 2006

(65) Prior Publication Data
US 2009/0145997 A1     Jun. 11, 2009

Related U.S. Application Data

(60) Provisional application No. 60/717,145, filed on Sep. 14, 2005.

(51) Int. Cl.
  *B64C 27/10*  (2006.01)
  *B64C 27/16*  (2006.01)
(52) U.S. Cl. .............. 244/17.15; 244/17.27; 244/17.23; 244/17.11
(58) Field of Classification Search .............. 244/17.11, 244/17.23, 17.19, 17.21, 17.27, 17.15, 6, 244/7 A, 39, 139, 23 C; 446/36, 37, 38, 484, 446/49, 50, 51, 52, 53; 416/124, 128, 129, 416/19, 4
See application file for complete search history.

(56) References Cited

U.S. PATENT DOCUMENTS

| | | | | |
|---|---|---|---|---|
| 1,940,108 A * | 12/1933 | Sweet | ...................... | 244/17.15 |
| 3,108,764 A | 10/1963 | Sudrow | | |
| 3,138,348 A * | 6/1964 | Stahmer | .................. | 244/17.15 |
| 3,774,865 A | 11/1973 | Pinto | | |
| 3,997,131 A * | 12/1976 | Kling | ........................ | 244/23 R |
| 4,273,302 A | 6/1981 | Jordan | | |
| 4,807,830 A | 2/1989 | Horton | | |
| 5,064,143 A * | 11/1991 | Bucher | ..................... | 244/23 C |
| 5,240,204 A | 8/1993 | Kunz | | |
| 5,503,351 A | 4/1996 | Vass | | |
| 5,653,404 A * | 8/1997 | Ploshkin | .................... | 244/12.2 |
| 6,086,016 A | 7/2000 | Meek | | |
| 6,450,446 B1 | 9/2002 | Holben | | |
| 2004/0129833 A1* | 7/2004 | Perlo et al. | ..................... | 244/70 |

* cited by examiner

*Primary Examiner*—Michael R Mansen
*Assistant Examiner*—Richard R Green
(74) *Attorney, Agent, or Firm*—GrayRobinson, P.A.

(57) ABSTRACT

Disclosed is a rotary winged aircraft. More specifically, this invention relates to an aircraft wherein lift is generated by two discs which rotate about a central axis. The discs generate equal and opposite forces such that the central axis remains fixed, thereby allowing it to be used for a crew compartment. In one embodiment, the two discs are concentrically located.

1 Claim, 11 Drawing Sheets

FIG. 6
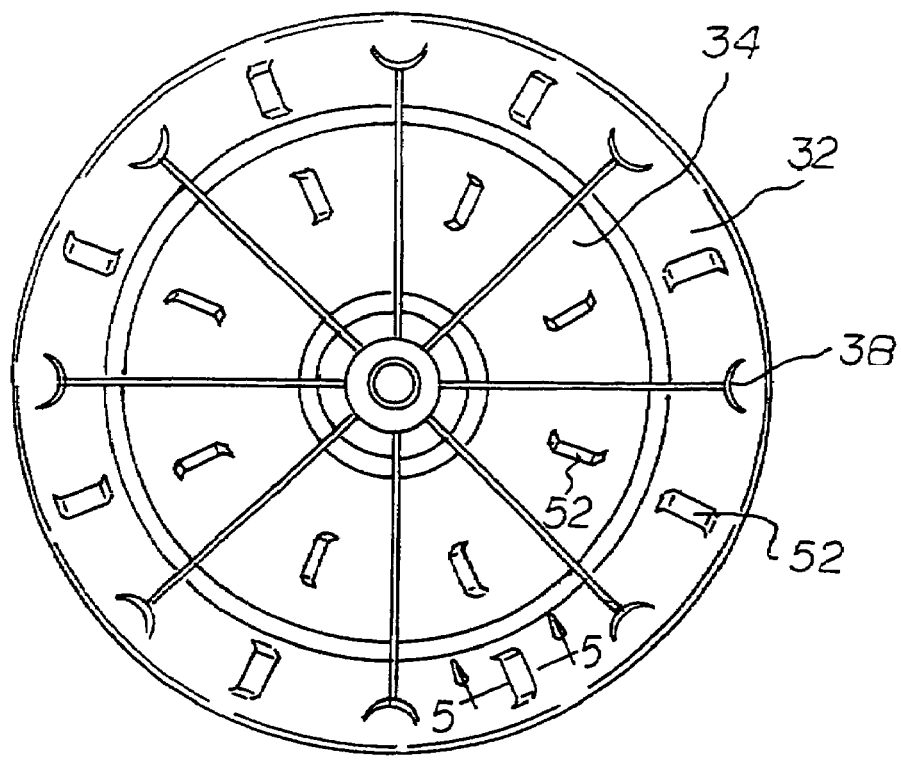
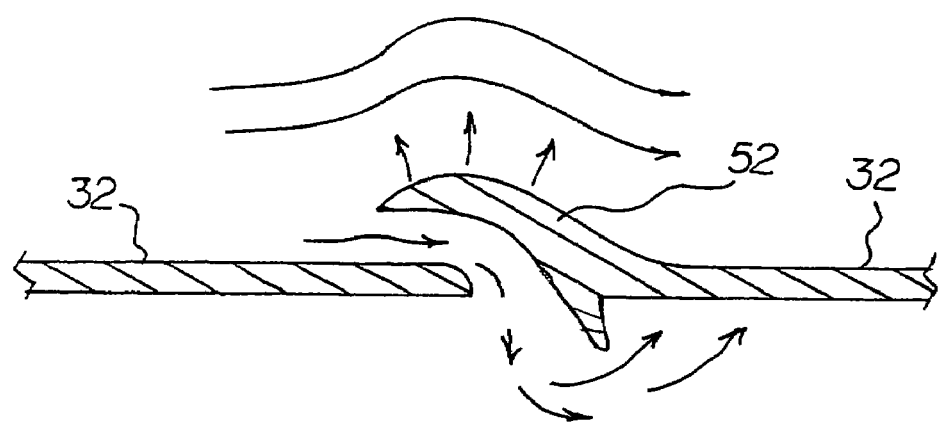
FIG 5

FIG. 9
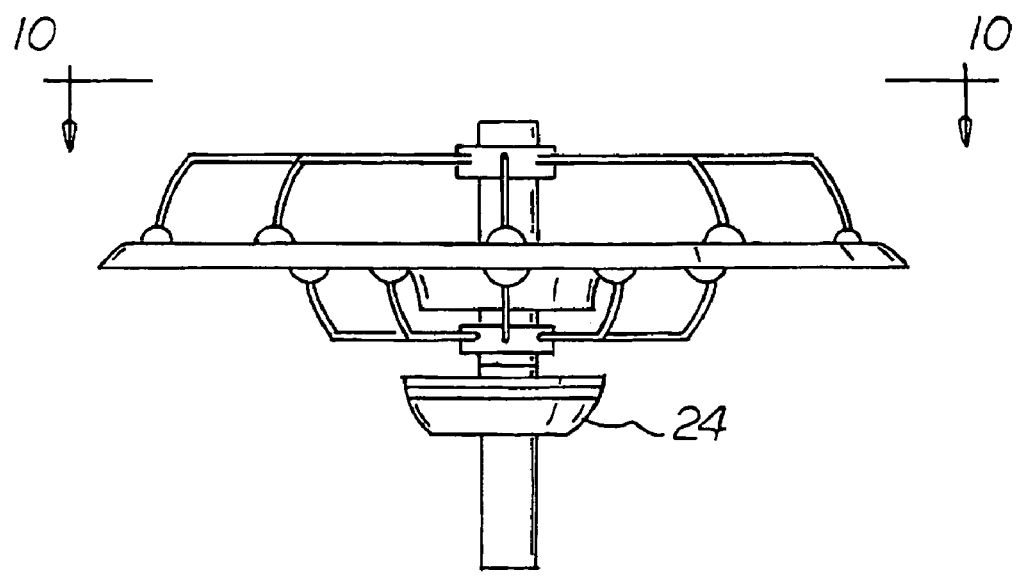
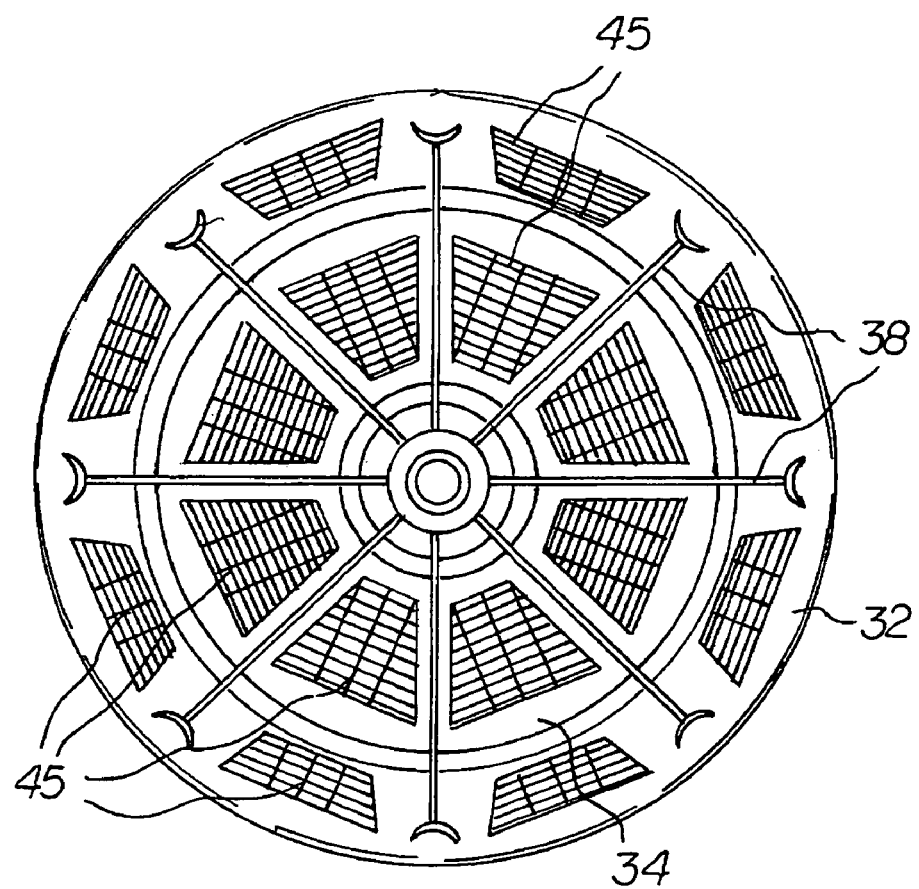
FIG. 10

FIG. 11
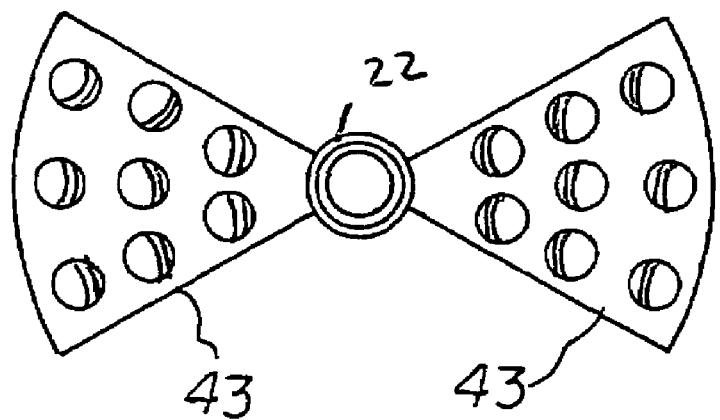
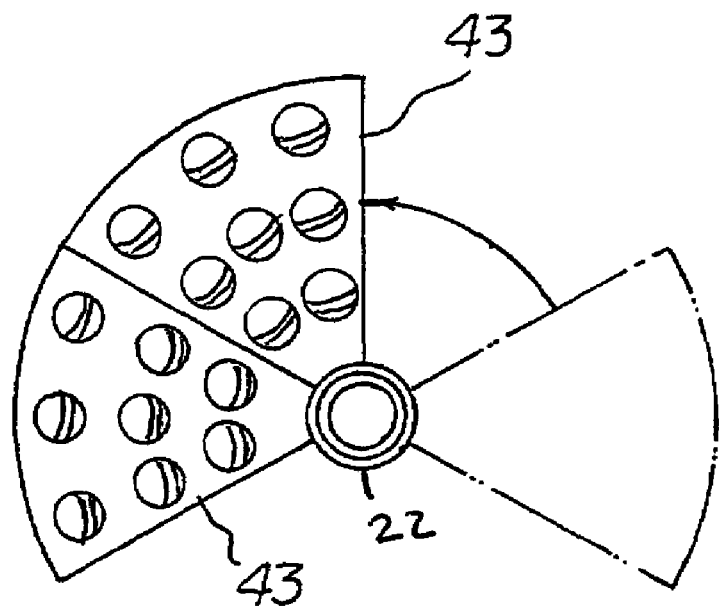
FIG. 11A (a)

(b)

(c)

(d)

(e)

(a)

(b)

(c)

(d)

(e)

(a)

(b)

(c)

(d)

(e)

(f)

(a)

(b)

(c)

INTEGRAL POWERED WING AIRCRAFT

RELATED APPLICATION DATA

This application claims priority from provisional application Ser. No. 60/717,145 filed on Sep. 14, 2005 entitled Integral Powered Wing Aircraft, the contents of which are incorporated herein by reference.

BACKGROUND OF THE INVENTION

1. Field of the Invention

This application relates to an improved aircraft design. More specifically, the present invention relates to an aircraft design consisting of two concentrically oriented contra-rotating discs, whereby rotational forces generated by the discs are equal and opposition to each other such that a central axis remains fixed.

2. Description of the Background Art

The background art contains many different examples of ways to generate lift for an aircraft. For example, U.S. Pat. No. 5,240,204 to Kunz discloses an aircraft with a disk that is positioned between first and second counterrotating blade assembles. The disc generates lift in vertical flight or while hovering due to radial flow of air over an upper surface.

U.S. Pat. No. 4,807,830 discloses an aircraft with an aerodynamic annulus and a fuselage coupled to the annulus by electromagnetic means to permit rotation of the annulus relative to the fuselage without mechanical engagement.

Lastly, U.S. Pat. No. 3,108,764 to Sudrow discloses a ducted rotor sustained aircraft with a means for generating forward thrust. The ducted rotor includes a circular structure of a suitable aerodynamic form. Axially mounted in the duct is a hub that carries counter-rotating rotors that support the aircraft.

Although each of the above referenced inventions achieves its individual objective, none of the inventions contemplate the use of concentrically located counter-rotating discs.

SUMMARY OF THE INVENTION

It is therefore one of the objectives of this invention to provide an aircraft with contra-rotating discs wherein the discs are concentrically located with respect to one another.

It is also an object of this invention to provide a rotary aircraft with a central fixed axis for use in supporting a passenger compartment.

The invention is carried out by providing an aircraft with a central axle, comprising a top end and a bottom end; a first rotating disc, having a centrally-located aperture with the central axle positioned within the aperture; a first bearing collar attached to the first rotating disc and rotatably connected around the central axle; a second rotating disc, having a centrally-located aperture with the central axle positioned within the aperture; and a second bearing collar attached to the second rotating disc and rotatably connected around the central axle.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5. is a detailed view taken along line 5-5 of FIGS. 6 and 7.

FIG. 6 is another alternative embodiment wherein the concentrically located discs include rotary air deflectors.

FIG. 9 is another alternative embodiment of the present invention.

FIG. 10 is a detailed view taken along line 10-10 of FIG. 9 wherein solar panels are attached to the top surface of both discs.

FIG. 11 is a detailed view of the directional deflector/stabilizers as taken along line 11-11 of FIG. 8.

FIG. 11a is an additional view of the directional deflector/stabilizers in an alternative configuration.

Similar reference characters refer to similar parts throughout the several views of the drawings.

DETAILED DESCRIPTION OF THE PREFERRED EMBODIMENT

The present invention relates to a rotary winged aircraft. More specifically, the invention relates to an aircraft wherein lift is generated by two discs which rotate about a central axis. The discs generate equal and opposite forces such that the central axis remains fixed, thereby allowing it to be used for a crew or cargo compartment. In one embodiment, the two discs are concentrically located. The various components of the present invention, and the manner in which they interrelate, will be described in greater detail hereinafter.

This invention pertains to a dual concentric contra-rotating rotary wing aircraft. The one rotating disc shaped wing has a fixed pitch about a vertical axis. The second contra rotating disc shaped wing is variable pitch about the vertical axis. The vertical axis is physically a rigid axle about which the two discs rotate in their opposite directions. A payload compartment or gondola is attached to the bottom end for passengers, pilot, fuel, controls, armament or cargo.

One purpose in developing this aircraft is to improve upon many of the characteristics and functions of a helicopter, specifically, vertical take-off, low altitude flying, multi-directional control at low speeds, landing without an airstrip, performing rescue missions, lifting capacity, versatility, safety and flying characteristics. Some problems with helicopters are the noise and safety concerns. Another problem is that when the rotor stops the helicopter comes down hard. The present invention overcomes these problems and provides a vehicle that is useful for combat, sightseeing, heavy lifting, traffic reporting, and commuting just as is the helicopter.

Figure 1:
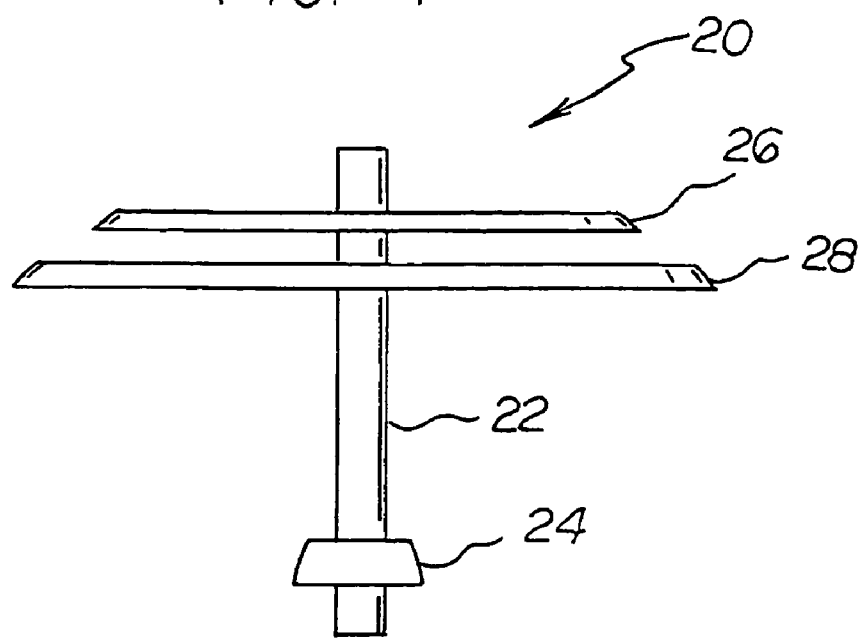
FIG. 1 is a schematic depiction of the rotary winged aircraft of the present invention.
Figure 2:
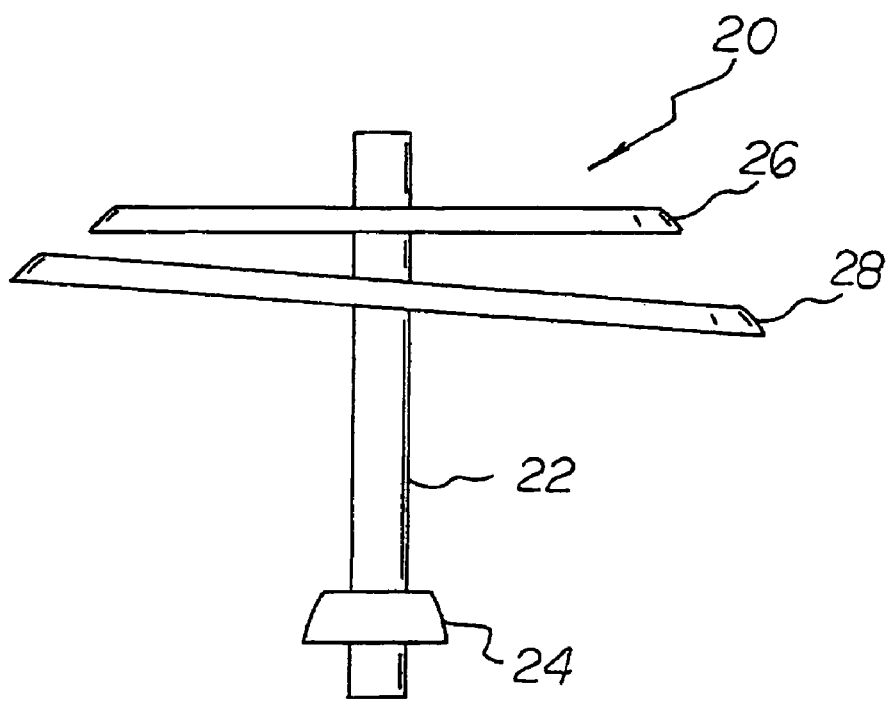
FIG. 2 is a schematic depiction of the rotary winged aircraft of the present invention wherein the lower disc is pivoted to provide for directional control of the aircraft.

With reference now to FIGS. 1 and 2, the basic embodiment 20 of the present invention is disclosed. This embodiment includes a central fixed axle 22 at the end of which a crew compartment or gondola 24 is secured. Although the present invention is not intended to be limited to any specific sizes, in at least one embodiment, the crew compartment is large enough to hold 2 or more people. The upper extent of axle 22 includes two rotating discs.

In the depicted embodiment, the upper disc 26 is slightly smaller than the lower disc 28. The disc sizes can vary anywhere from less than 10 feet to 50 feet or more in diameter. Either or both discs can be hollow to provide for storage of fuel or other items. The discs can also have a number of shapes such as concave, convex, flat, mushroom or hemispherical. The specific shape selected will depend upon the desired operating characteristics and capabilities.

Both discs generate lift similar to the way in which a toy Frisbee® generates lift upon being tossed. This lift is enhanced by lift structures 52 on each disc as shown in FIGS. 5 and 6. In an important aspect of the present invention, both discs (26 and 28) also generate equal amounts of torque to the central axle 22. In this way, the crew compartment 24 remains fixed at all times. In order to achieve these counter acting forces, and because the discs are not the same size, the upper disc 26 rotates at a slightly faster speed than the lower disc 28. Power to each disc can be modulated by transformers to increase or decrease energy supplied as one means to maintain balanced torque in both directions as applied to the axle at all times to avoid any unbalanced forces on the payload/axle. In an alternative embodiment, as depicted in FIG. 10, the top surface of both discs 32 and 34 is covered with solar panel 45. The individual solar panels collect sunlight which is then converted into electricity by solar cells. The electricity is then stored inside the discs by various means, such as batteries, or is used to directly energize the rotating discs. The stored energy can be used when current sunlight does not provide sufficient operating power.

The relationship between the discs and the axle is analogous to an electric motor. It is customary to picture an electric motor as a fixed housing with a rotating armature. In reverse thinking the armature can be fixed and the housing can rotate. In the rotary craft the axle has the armature fixed to it and the discs rotate around it as the housing. If each disc exerts the same opposite torque on its respective armature the axle does not turn and the payload is stable. The two counter forces would be maintained in equilibrium by increasing or decreasing electric current to either of the rotating discs. An additional means for maintaining the axle equilibrium would be a magnetic or physical clutch, such as friction, to create a compensating drag between the axle and the disc that is not producing excess torque. There are many ways to do this.

Direction of the aircraft is controlled by mounting the armature of one of the rotating discs to a flexible bearing mount controlled by hydraulic arms. The arms can rotate the armature about the axle within a limited degree of freedom. The angel of rotation depends upon how the aircraft is designed and its purpose. FIG. 2 illustrates the lower disc 28 being pivoted relative to the central axle 22. As noted, this pivoting would be achieved by hydraulic arms (not shown). However, it is within the scope of the present invention to use other suitable means for pivoting the disc. For example, pneumatics could be used in place of hydraulics. Alternatively, the disc could be pivoted with a cable system powered by an electric motor.

Whatever means are employed, the essential requirement is that the pilot be capable of tilting disc 28 relative to central axle 22. By pivoting the disc in this manner, the lift generated by the disc is vectored thereby allowing for directional movement of the aircraft. At all times during the steering, the non-pivoted disc provides a counterforce to steer against. Although the invention is illustrated with disc 28 being tilted, those of ordinary skill in the art will appreciate that the upper disc 26 could be selectively titled to achieve the same steering function.

The steering can be achieved by way of a pilot within gondola 24 or in a remote control center using a computer that communicates with a "fly-by-wireless" system wherein the three main components of the aircraft, the first disc, the second disc and the axis, each has its own transmitter and programmable logic circuits. The fly-by-wireless system uses a digital controller to wirelessly transmit control information to a flight computer. The transmission can be of any wave from light, sound or magnetic.

Figure 3:
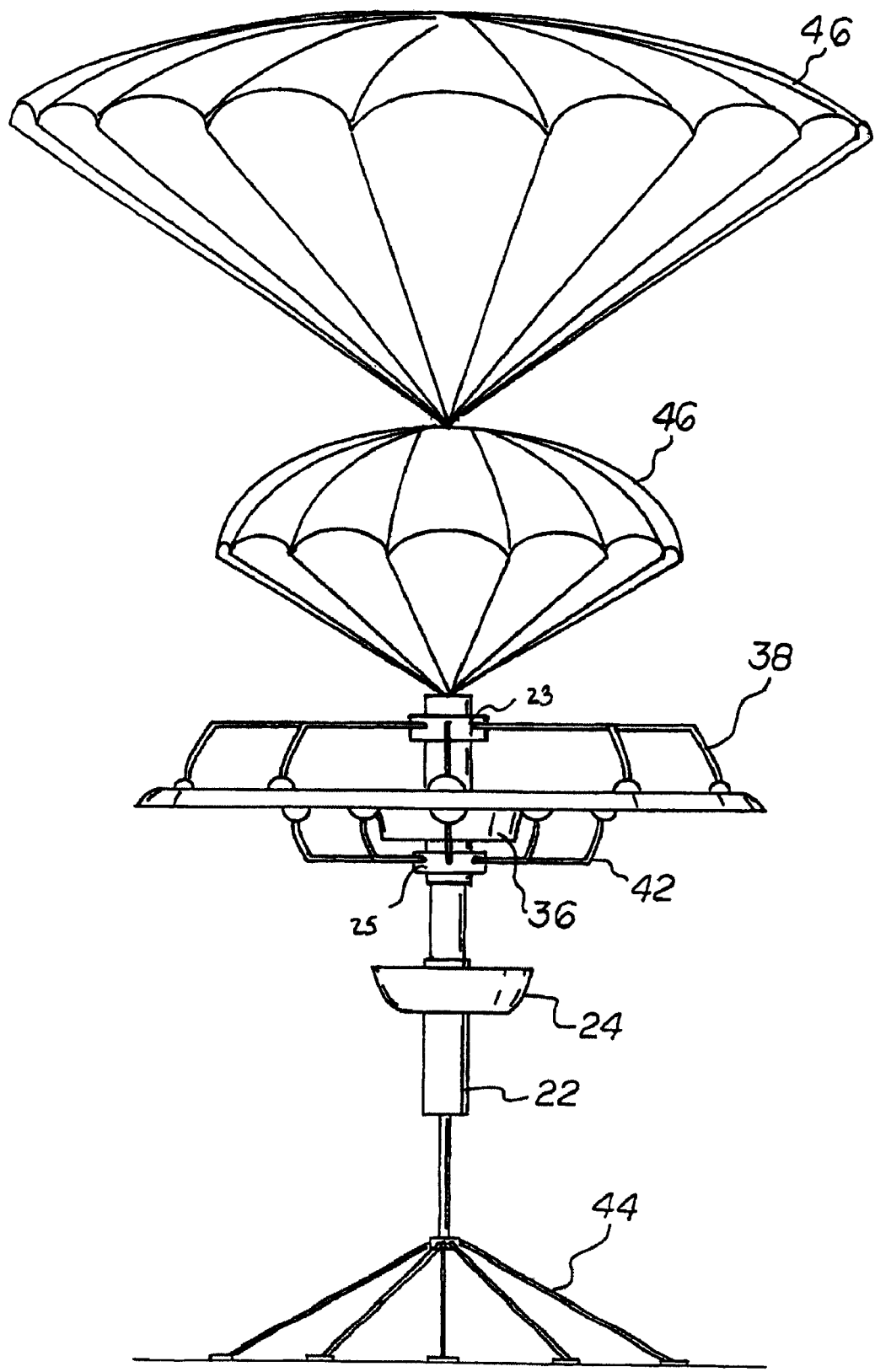
FIG. 3 is an alternative embodiment of the rotary winged aircraft employing concentrically located contra-rotating discs.

An alternative embodiment of the present invention is depicted in FIG. 3. This embodiment operates on the same principles discussed above, however, instead of the two discs being spaced from one another as upper and lower discs, they are concentric with one another. Thus, instead of two discs rotating about an armature, the two discs rotate about each other in a fashion analogous to a linear electric induction motor. Namely, this embodiment includes an outer disc 32 that is equivalent to a housing and an inner disc 34 that is equivalent to an armature (note FIG. 4*a*). In this configuration the discs would always have equal counter torque because they would be pushing against each other. The two discs are held in place by two bearing collars (23 and 25) around the axle. Additional support would be provided by mounting arms 38 and 42. In this embodiment, each disc must store and provide its own electrical energy.

Directional control of this embodiment could be achieved in the same manner described in the primary embodiment. Namely, either the inner disc 34 or the outer disc 32 (FIG. 4) could be pivoted by a hydraulic arm to yield a vectored lift.

Figure 8:
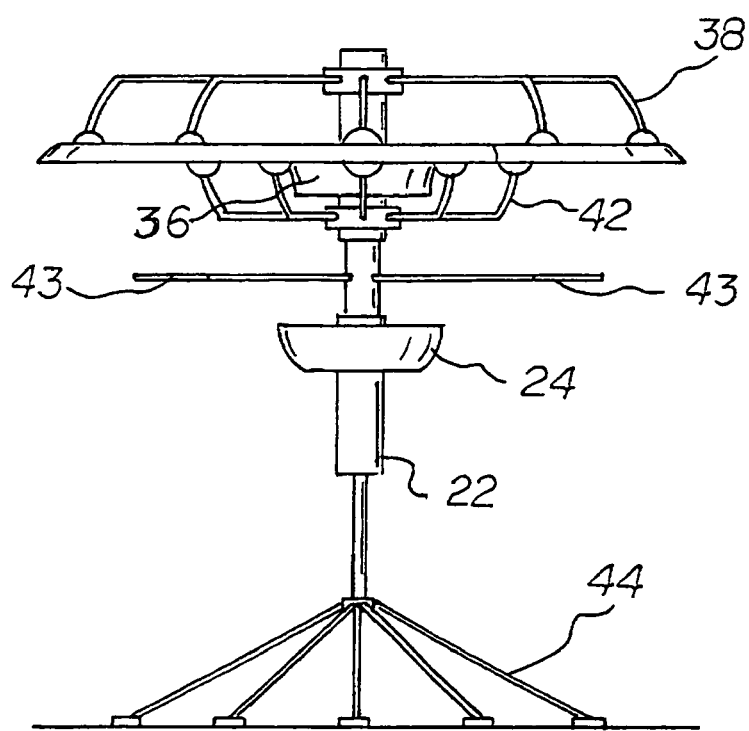
FIG. 8 is another alternative embodiment of the present invention wherein directional deflector/stabilizers are positioned below the concentrically located discs.

FIG. 8 depicts an alternative steering arrangement. In this embodiment, two wedge-shaped or pie-shaped directional deflector/stabilizers 43, comprising 60, 90, or even up to 180 degrees, are provided. Each stabilizer is perforated with holes to deflect air. More specifically, the holes are angled openings that route downwardly flowing air outwardly away from the central axle 22. Thus, the apertures function to vector the airflow generated by the counter rotating discs. The stabilizers 43 are attached by bearings to the vertical concentric axis of the two opposing discs and are positioned below both of the discs 32 and 34. Each deflector 43 can rotate independently around the central axle 22 providing the ability for the two deflectors 43 to be positioned either on opposite sides of the central axle 22 (FIG. 11), or next to one another on the same side of the central axle 22 (FIG. 11a). FIG. 11 illustrates the deflectors 43 in a neutral position, whereby no directional movement is imparted to the aircraft. FIG. 11a illustrates the deflectors 43 in a positive direction position whereby air flow is greater on one side of the aircraft and movement is imparted to the aircraft.

With the deflectors 43 positioned next to one another, wind is driven downward from the contra rotating discs into the deflectors 43 which divert the wind to propel the vehicle in the opposite direction. As the deflectors 43 are rotated slowly about the axis, the direction of the vehicle changes. If the deflectors 43 are designed such that all the openings in the wedge can be concurrently closed the vehicle would tilt in the direction of the wedge thereby causing a different type of aerodynamic directional maneuver. The deflectors 43 can be rotated so that they are positioned on opposite sides of the central axle 22, the wind will be deflected such that the aircraft will hover as opposed to being propelled in a particular direction. The deflectors 43 could also be typed, or angled, relative to the upper discs to stabilize torque load on the axle 22.

Figure 12:
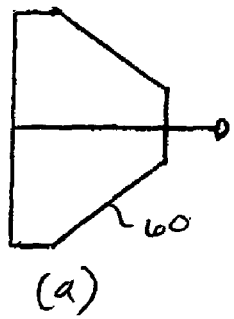
FIGS. 12(*a*)-12(*e*) illustrate an alternative trapezoidial shaped deflector.
Figure 12:
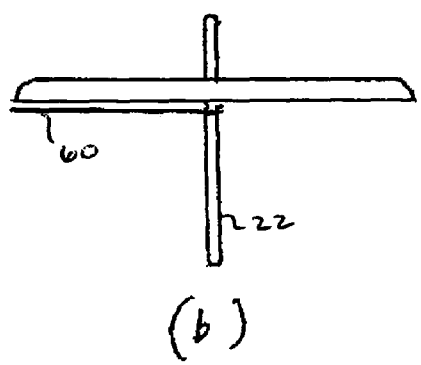
Figure 12:
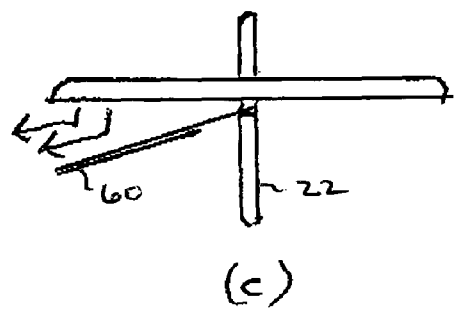
Figure 12:
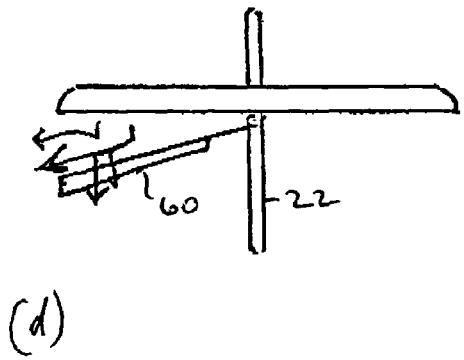
Figure 12:
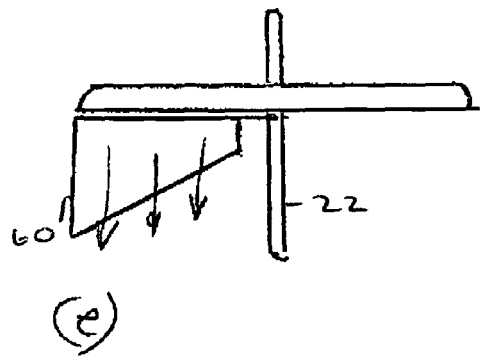
Figure 13:
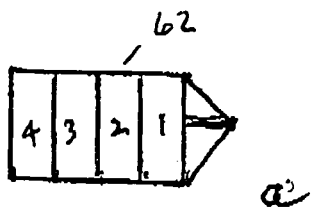
FIGS. 13(*a*)-13(*e*) illustrate an alternative retractable deflector.
Figure 13:
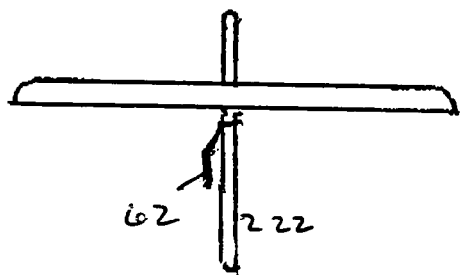
Figure 13:
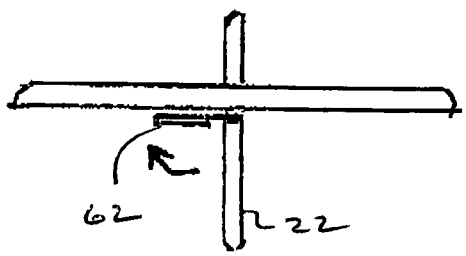
Figure 13:
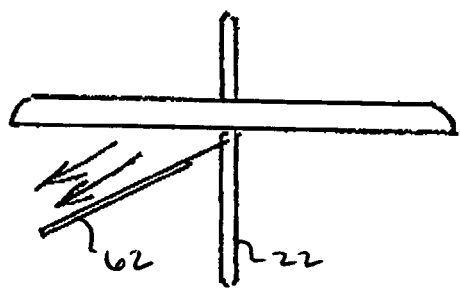
Figure 13:
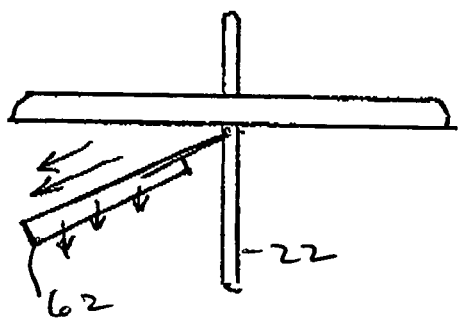
Figure 14:
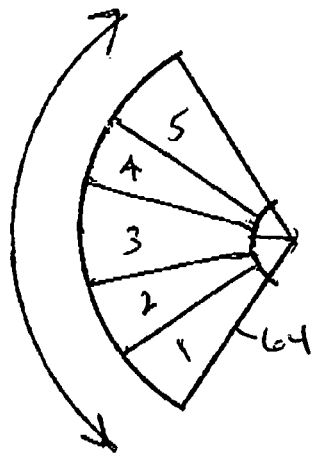
FIGS. 14(*a*)-14(*f*) illustrate an alternative fan shaped deflector.
Figure 14:
Figure 14:
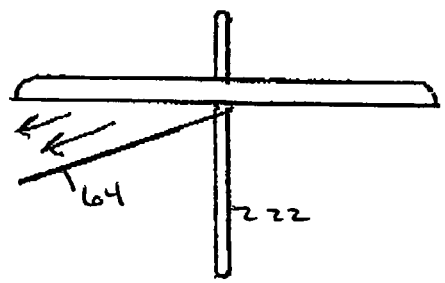
Figure 14:
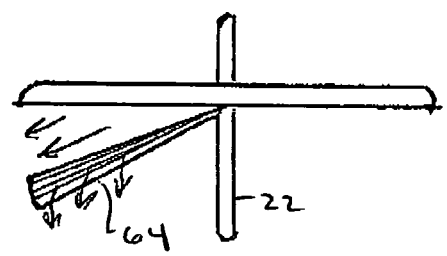
Figure 14:
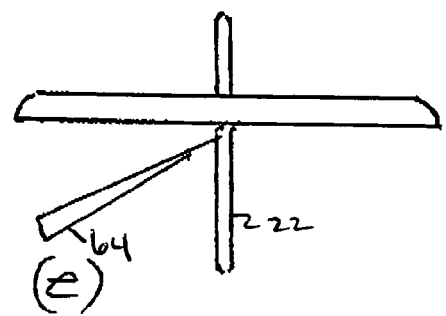
Figure 14:
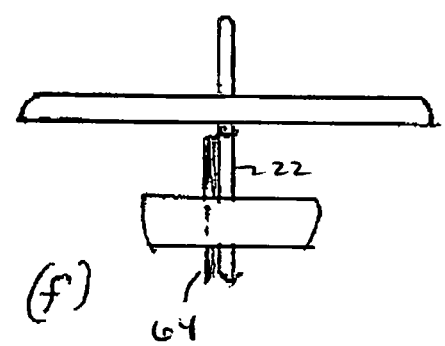

Additional Directional Deflector/Stabilizer embodiments are shown in FIGS. 12, 13 and 14. FIG. 12 is a flat trapezoid deflector 60 with no openings in the surface. It is hinged down the middle and is connected to the axle 22 with thin structural members. FIG. 12(a) depicts the flat deflector. In FIG. 12(b) it is shown parallel to the upper discs. In FIG. 12(c) the deflector is dipping. Namely, the deflector 60 is positioned at an angle relative to the upper discs. When the deflector dips the discs will move in the opposite direction. The dip angle is variable. In addition to dipping the deflector, it can be tipped as shown in FIG. 12(d). The deflector is tipped when one outside corner is dipped lower than the opposite outside corner. Namely, one side of the deflector is angled downwardly relative to the central axis. Tipping rotates the payload compartment and can be used as an alternative means of counteracting axle rotation when one disc is exerting greater torque than the other. The dipping and tipping can be used to help stabilize the aircraft during wind gusts or if weapons are being fired. When deflector 60 is stewed the discs will tend to move up and down vertically but not horizontally. Stowing a deflector means it is positioned to provide minimum impact on air flow from the discs. This deflector is stowed by folding it lengthwise along the hinge as depicted in FIG. 12(e). The deflector can fold up or down. Down folding is preferred because it can be opened with a spring loaded mechanism that increases the spring force as the wind resistance increases.

Another folded deflector embodiment is depicted in FIG. 13(a). Here, the deflector 62 is a flat piece of metal in four sliding sections. The sections 4, 3 and 2 are retracted under section 1 for stowing as depicted in an end view in FIG. 13(b). When stowed, the aircraft has no horizontal steering direction. In FIG. 13(c) the deflector is ready to deploy. It could be used in this single panel configuration if not much steering is wanted. In FIG. 13(d) the deflector is deployed. In FIG. 13(d) the deflector is also dipped relative to the upper discs to give the aircraft forward movement. In FIG. 13(e) the deflector is tipped slightly about its central axis to counter a payload rotation. The deflector is deployed from a stowed position in FIG. 13(b) to a partially deployed position in FIG. 13(c) with a spring loaded mechanism as depicted in FIG. 15(a). The deflector is fully deployed to the position in FIG. 13(d) with a pneumatic, hydraulic or motor driven mechanism.

FIG. 14(a) depicts a deployed peacock deflector 64. Any number of panel sections, in this depiction there are 5, may unfold like peacock feathers to form the deployed deflector 64. In FIG. 14(c) it is dipping (i.e. it is angled relative to the upper discs) to move the aircraft. In FIG. 14(d) it is tipping to stabilize the payload (i.e. it is pivoted about a central axis). In FIG. 14(b) the peacock deflector 64 has closed its panels into one section width. In FIG. 14(c) the deflector is ready to stow. Depicted in FIG. 14(f) the deflector is stored parallel to the axle into a niche provided in the side of the gondola.

Figure 15:
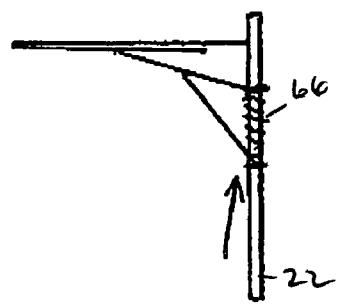
FIGS. 15(*a*)-15(*c*) illustrate a spring mechanism for deploying the deflectors of FIGS. 12-14.
Figure 15:
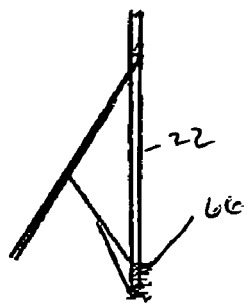
Figure 15:
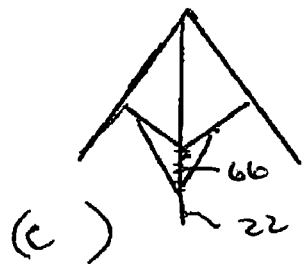

FIG. 15 depicts a spring loaded mechanism 66 for deploying all three of these deflectors from a stowed position. In FIG. 15(a) the deflector is deployed and the spring loaded mechanism is open. Here, the mechanism is at maximum spring decompression, although it still has a substantial compressor built in. As the mechanism is stowed in FIG. 15(b) the spring is compressed. Here, the spring is almost fully compressed. When the deflector is straight down the spring is fully depressed. Stowing requires the most force to compress the spring when the downward draft from the discs on deflector are greatest. In deployment the spring exerts the greatest force about the same time as the wind resistance on the deploying deflector increases.

Again, the aircraft could be electrically powered either via batteries, solar cells, or via electricity generated by a combination motor and generator onboard the payload gondola. Capacitors in addition to fuel cells could also be used to power the aircraft and give it bursts of energy when needed.

As with the embodiment of FIGS. 1 and 2, FIG. 3 illustrates a gondola 24 secured to the lower end of axle 22. The embodiment of FIG. 3 further illustrates landing gear 44 that extend from the lower end of axle 22 and provide support for the aircraft when it is stationary. The landing gear is especially configured to absorb the hard shocks created by hard or emergency landings. The gear can also be used while on the ground to move the aircraft to track the sun's position and, thereby, keep the solar cells on the discs charged. In the absence of landing gear, the aircraft can be maneuvered into a hollow cylindrical stem at a base or landing facility. The cylindrical stem could also act to recharge on-board batteries.

In addition to landing gear, axle 22 can also be used as an antenna, as a location for a computer and as a mounting for a 360 hemispherical observation cameras.

Emergency parachutes 46 can also be provided at the upper end of axle 22 to control the rate of decent in the event of a loss of lift. In another embodiment, parachutes 46 would be deployed in addition to the payload compartment 24 being dropped gently down from the bottom of the axle 22 by cables (not shown). The purpose of this would be to keep enough tension along axle 22 so the two discs remain horizontal and the axle remains vertical thereby providing a softer landing.

Figure 4:
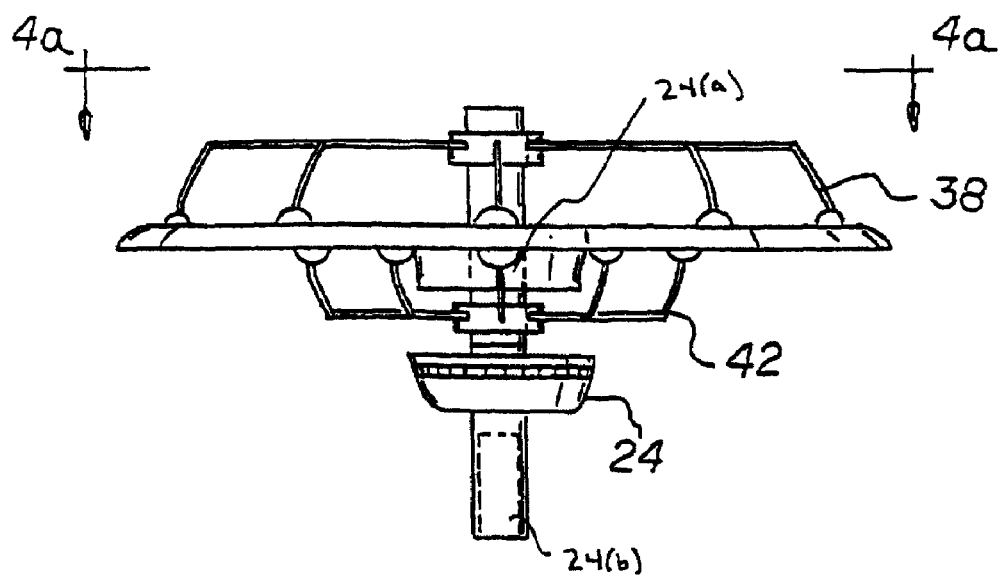
FIG. 4 is a detailed view of the concentrically located contra-rotating discs of the alternative embodiment.
Figure 4A:
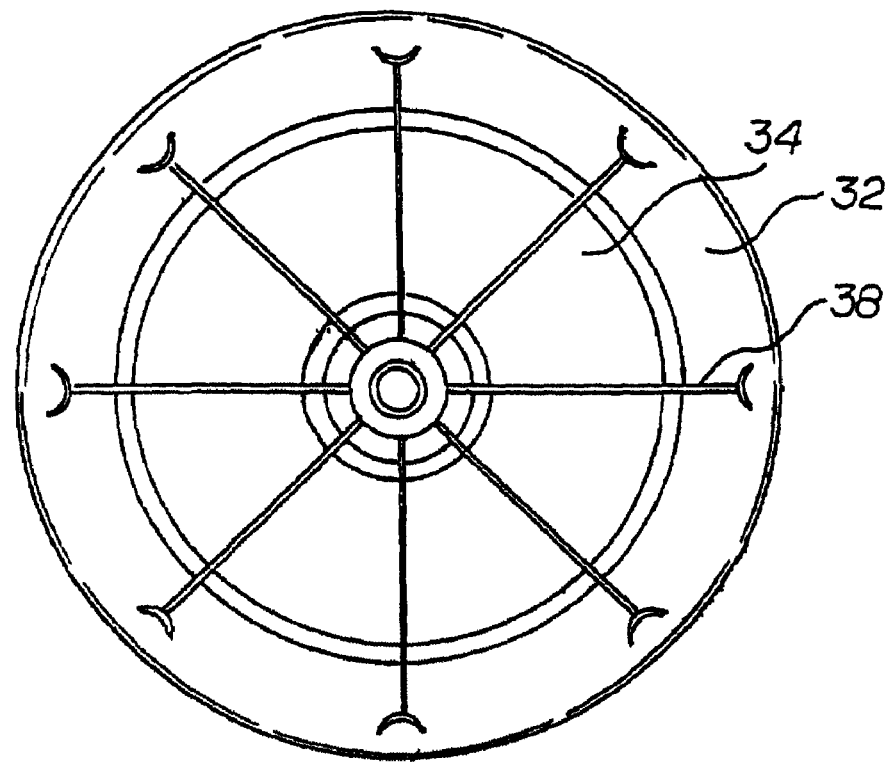
FIG. 4a is a view of the concentrically located contra-rotating discs taken along line 4a-4a of FIG. 4.

FIG. 4 is a detailed view of the contra-rotating discs depicted in FIG. 3. The dotted line of FIG. 4 illustrates the compartment 24(b) in which landing gear 44 is stored. A similar compartment 24(a) is contained within the upper end of axle 22 for the storage of parachutes 46. FIG. 4a is a top plan view of the contra-rotating discs (32 and 34) along with the upper mounting arm 38.

Figure 7:
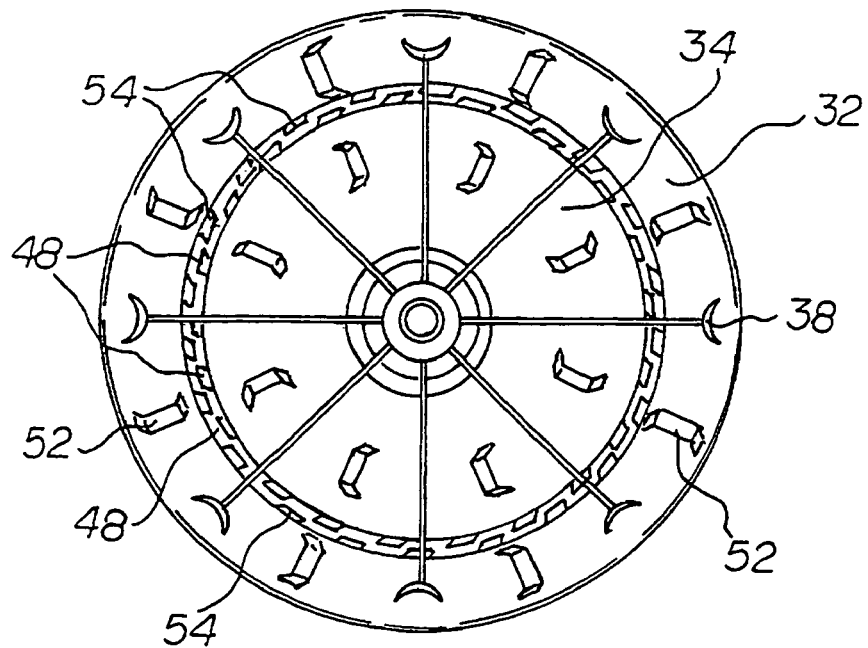
FIG. 7 is another alternative embodiment of the present invention wherein the concentrically located discs are rotated with respect to one another via electromagnets.

Still yet another alternative embodiment is illustrated in FIG. 7. This embodiment illustrates one manner of powering the concentrically located counter-rotating discs (32 and 34). Namely, the outer edge of the smaller, inner disc 34 has a number of equally spaced electro magnets 48 around its periphery. Likewise, the inner edge of the larger, outer disc 32 has a series of correspondingly spaced electro magnets 54. The magnets 48 and 54 are chosen such that they each have the same polarity and, therefore, repel against one another. Thus, as the two discs (32 and 34) rotate there is always a number of magnets in close proximity to each other. Circuitry well known in the art of programmable logic circuits (PLC) is used to coordinate the alternate rapid energizing and polarity of the magnets. As the discs (32 and 34) turn faster more magnets are creating resistance at a greater frequency so the torque driving the discs (32 and 34) increases causing the discs to turn always faster. However, as the discs (32 and 34) turn faster the aerodynamic resistance against the rotating discs (32 and 34) also increases until there is an equilibrium limited by the energy available.

An aircraft powered by a combination motor and generator would supply electricity to both discs in both embodiments using copper brushes at the bearing collars where discs are secured to the axle. In this embodiment, the alternative disc configuration of FIG. 7, where the outer and inner discs push against one another, the synchronization of the magnetic fields could be coordinated by the brushes as in a conventional electric motor instead of by PLC circuitry. The magnets in FIG. 7 can be oriented to help prevent the two discs from ever rubbing together or touching.

In the embodiment of FIG. 6, the discs include slots 52. These slots are designed to enhance the rotational aerodynamic lift of the discs. These slots 52 can be any length, any quantity, and any number of aerodynamic profiles. As the disc rotates forward, air is forced into the slots forcing air downward and the disc upward. Thus, the air flowing over the slot provides lift like air flowing over a conventional airplane foil.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A rotary-winged aircraft, comprising:
 a rigid cylindrical central axle, having a top end and a bottom end;
 a first rotating disc, having a top surface, a bottom surface, an inner circumference, an inner diameter;
 a second rotating disc, having a top surface, a bottom surface, an outer circumference, an outer diameter, wherein the outer diameter of the second rotating disc is smaller than the inner diameter of the first rotating disc, and a centrally-located aperture with the central axle being rotatably positioned within the aperture;
 an upper bearing collar rotatably connected around the central axle above the first rotating disc;
 a first plurality of mounting arms each having a proximal end and a terminal end, the proximal ends of the first plurality of mounting arms secured to the upper bearing collar, the terminal ends of the first plurality of mounting arms affixed to the top surface of the first rotating disc;
 a lower bearing collar rotatably connected around the central axle below the second rotating disc;
 a second plurality of mounting arms each having a proximal end and a terminal end, the proximal ends of the second plurality of mounting arms secured to the lower bearing collar, the terminal ends of the second plurality of mounting arms affixed to the bottom surface of the second rotating disc and functioning to attach the second rotating disc concentrically within the first rotating disc;
 a first plurality of electro magnets affixed to the inner circumference of the first rotating disc at spaced intervals;
 a second plurality of electro magnets, affixed to the outer circumference of the second rotating disc at spaced intervals, wherein the polarity of the first plurality and second plurality of electro magnets is the same, such that the first plurality of electro magnets and the second plurality of electro magnets will repel one another, functioning to provide contra-rotation of the first and second discs;
 circuitry to coordinate alternate rapid energizing of the first plurality and second plurality of electro magnets as the rotating discs contra-rotate, functioning to change the respective rates of rotation of the first rotating disc and the second rotating disc, whereby the discs apply equal and counteracting torques upon the central axis such that the central axis remains stationary;
 a first compartment located in the top end of the central axle;
 a plurality of parachutes stored in and deployable from the first compartment;
 a second compartment located in the bottom end of the central axle;
 a plurality of landing gear stored in and deployable from the second compartment, such that the plurality of landing gear function to absorb the shocks created by landings;
 a gondola attached at the lower extent of the central axle;
 two wedge-shaped deflectors, rotatably attached around the central axle, functioning to change direction of the aircraft when in flight by altering the flow of air coming from the contra-rotating first and second discs;
 a plurality of solar panels affixed to the top surface of the second rotating disc;
 a plurality of solar cells stored inside the second rotating disc; and
 circuitry connecting the plurality of solar cells with the plurality of solar panels, whereby the solar cells power the electromagnets.

\* \* \* \* \*